(12) United States Patent
Kondapalli et al.

(10) Patent No.: US 11,567,284 B2
(45) Date of Patent: Jan. 31, 2023

(54) METHOD FOR PERFORMING CURING DURING MANUFACTURING OF AN OPTICAL FIBRE RIBBON

(71) Applicant: Sterlite Technologies Limited, Gurgaon (IN)

(72) Inventors: Hemanth Kondapalli, Gurgaon (IN); Vikash Shukla, Gurgaon (IN); Atulkumar Mishra, Gurgaon (IN); Kishore Chandra Sahoo, Gurgaon (IN)

(*) Notice: Subject to any disclaimer, the term of this patent is extended or adjusted under 35 U.S.C. 154(b) by 310 days.

(21) Appl. No.: 16/801,568

(22) Filed: Feb. 26, 2020

(65) Prior Publication Data
US 2021/0063663 A1 Mar. 4, 2021

(30) Foreign Application Priority Data
Sep. 4, 2019 (IN) .............................. 201911035651

(51) Int. Cl.
*G02B 6/44* (2006.01)

(52) U.S. Cl.
CPC .................... *G02B 6/448* (2013.01)

(58) Field of Classification Search
CPC ...................................................... G02B 6/448
USPC ........................................................ 427/508
See application file for complete search history.

(56) References Cited

U.S. PATENT DOCUMENTS

2011/0287195 A1* 11/2011 Molin .................... B05D 3/067
427/595

* cited by examiner

Primary Examiner — Jerry M Blevins
(74) Attorney, Agent, or Firm — Steven R. Fairchild; Michael J. Pennington

(57) ABSTRACT

The method provided by the present disclosure is for performing curing during manufacturing of an optical fibre ribbon. The method of the present disclosure performs a first stage of curing and a second stage of curing 200 on a matrix material of the optical fibre ribbon. The first stage of curing is performed using a ribbon die and one or more ultraviolet light emitting diode (UV LED) units. Further, the second stage of curing is performed using a source of the one or more ultraviolet lamps (UV lamps) in an UV chamber.

13 Claims, 2 Drawing Sheets

METHOD FOR PERFORMING CURING DURING MANUFACTURING OF AN OPTICAL FIBRE RIBBON

BACKGROUND OF THE INVENTION

Field of the Invention

The present disclosure relates to the field of optical fibre ribbon and, in particular, relates to a method for performing curing during manufacturing of an optical fibre ribbon. The present application is based on, and claims priority from an Indian Application Number 201911035651 filed on 4 Sep. 2019, the disclosure of which is hereby incorporated by reference herein.

Description of the Related Art

Optical fibres are widely used for communication over long distances. An optical fibre is a thin flexible fibre with a glass core through which light signals can be sent with very little loss of strength. Generally, the optical fibre consists of a core, a cladding and coating layers for protection. The optical fibres are combined together using a matrix material in the form of an optical fibre ribbon. The optical fibre ribbon is not flexible and require curing using ultraviolet light. Conventionally, the optical fibre ribbon undergoes single stage curing which is capable of making only the matrix material over the optical fibre ribbon flexible. The optical fibre ribbon remains brittle and variations in width of the optical fibre ribbon may be observed after the single stage curing.

In light of the above stated discussion, there is a need for method of curing which can overcome the above stated disadvantages.

BRIEF SUMMARY OF THE INVENTION

The present disclosure provides a method for performing curing during manufacturing of an optical fibre ribbon. The method performs a first stage curing on a matrix material of the optical fibre ribbon. In addition, the method performs a second stage of curing on the matrix material of the optical fibre ribbon. The first stage of curing is performed using a ribbon die and one or more ultraviolet light emitting diode (UV LED) units. Further, the second stage of curing is performed using a source of the one or more ultraviolet lamps (UV lamps) in an ultraviolet chamber.

A primary object of the present disclosure is to provide a method for performing curing during manufacturing of an optical fibre ribbon.

Another object of the present disclosure is to provide the optical fibre ribbon that is easily bendable in non-preferential axis without any fragility.

Yet another object of the present disclosure is to provide the optical fibre ribbon with improved flexibility and resilience.

Yet another object of the present disclosure is to maintain width and height of the optical fibre ribbon without any variations.

In an embodiment of the present disclosure, the one or more ultraviolet light emitting diode (UV LED) units (104) performs 80 percent of curing of the matrix material of the optical fibre ribbon in the first stage of curing.

In an embodiment of present disclosure, the ultraviolet chamber (204) performs 20 percent of curing of the matrix material of the optical fibre ribbon in the second stage of curing.

In an embodiment of the present disclosure, the one or more ultraviolet light emitting diode (UV LED) units emit electromagnetic radiations towards the optical fibre ribbon to perform the first stage of curing of the matrix material of the optical fibre ribbon.

In an embodiment of the present disclosure, the source of the one or more ultraviolet lamps (UV lamps) emits electromagnetic radiations towards the optical fibre ribbon to perform the second stage of curing of the matrix material of the optical fibre ribbon.

In an embodiment of the present disclosure, power output in the second stage of curing is in range of about 1000 watts to 1300 watts.

In an embodiment of the present disclosure, the one or more ultraviolet light emitting diode (UV LED) units emit electromagnetic radiations of wavelength in range of about 365 nanometer to 450 nanometer in the first stage of curing.

In an embodiment of the present disclosure, the one or more ultraviolet light emitting diode (UV LED) units are situated at a distance in range of about 5 millimeter to 40 millimeter from head of the ribbon die in the first stage of curing.

In an embodiment of present disclosure, the one or more ultraviolet light emitting diode (UV LED) units produce power output based on operating wavelength in range of about 1200 watts to 10000 watts in the first stage of curing.

In an embodiment of present disclosure, each lamp of the one or more ultraviolet light emitting diode (UV LED) units is incident on the optical fibre ribbon at an angle in range of about 35 degrees to 80 degrees in the first stage of curing.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
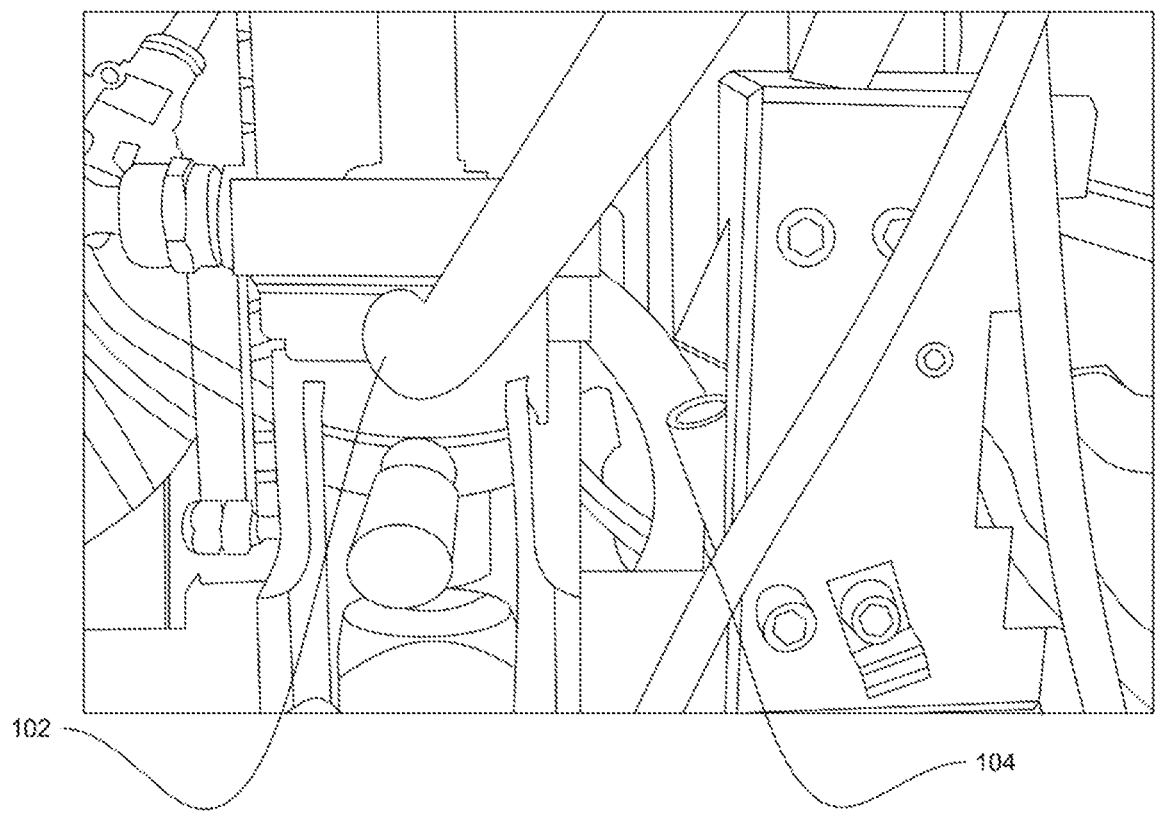
FIG. 1 illustrates a cross sectional view for performing first stage of curing during manufacturing of the optical fibre ribbon, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. Cross sectional view for performing a first stage of curing during manufacturing of an optical fibre ribbon.
102. A ribbon die.
104. UV LED units.

200. Cross sectional view for performing a second stage of curing during manufacturing of an optical fibre ribbon.
202. Source.
204. UV chamber.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Referring to FIG. 1, this is a cross sectional view for the first stage of the method for performing curing during manufacturing of an optical fibre ribbon 100, in accordance with an embodiment of the present disclosure. The cross sectional view for the first stage of the method for performing curing during manufacturing of an optical fibre ribbon 100 includes a ribbon die 102, and one or more ultraviolet light emitting diode (hereinafter UV LED) units 104.

The ribbon die 102 and the one or more UV LED units 104 collectively performs the first stage of the method for performing curing during manufacturing of an optical fibre ribbon 100. The first stage of the method for performing curing during manufacturing of an optical fibre ribbon 100 is performed on a matrix material of the optical fibre ribbon. In general, optical fibre ribbon includes a number of optical fibres arranged together within matrix material. In general, matrix material is made up of UV curable acrylate based resins. In addition, matrix material provides optimal handling characteristics such as superior heat strip, encapsulation, easy peel and breakout, good fibre geometry and robustness to optical fibre ribbon. Further, each optical fibre ribbon includes a plurality of optical fibres. In general, optical fibre refers to a medium associated with transmission of information over long distances in the form of light pulses. Moreover, optical fibre uses light to transmit voice and data communications over long distances.

The ribbon die 102 is utilized to hold the optical fibre ribbon. The optical fibre ribbon includes a plurality of optical fibres. In general, die is a specialized tool used in manufacturing industries to cut or shape material mostly using a press. In addition, dies are generally customized to the item they are used to create. In an embodiment of the present disclosure, the ribbon die 102 is a junction where grouping of the plurality of optical fibres takes place. In addition, the ribbon die 102 is used to group each of the plurality of optical fibres with facilitation of the matrix material. Further, the matrix material flows inside the ribbon die 102 that results into first stage of curing. Furthermore, the first stage of curing is pre-curing followed by post-curing of the optical fibre ribbon.

In general, a light emitting diode lamp is an electric light source for use in light fixtures that produces light using one or more light-emitting diodes. In addition, a light emitting diode is a semiconductor light source that emits light when current flows through it. Further, UV lamp stands for ultraviolet lamp. In general, ultraviolet lamp is a device for producing electromagnetic radiations in the wavelengths between those of visible light and X-rays. In addition, UV lamp is a lamp that emits electromagnetic radiations that makes black-light posters glow.

The one or more UV LED units 104 are situated directly after the ribbon die 102. The one or more UV LED units 104 are configured to emit electromagnetic radiations towards the optical fibre ribbon to perform curing of the matrix material of the optical fibre ribbon. In an embodiment of the present disclosure, the optical fibre ribbon is placed stationary between the one or more UV LED units 104. In another embodiment of the present disclosure, the optical fibre ribbon passes through the one or more UV LED units 104.

The one or more UV LED units 104 are situated at distance in range of 5 millimeter to 40 millimeter from the ribbon die 102. In an embodiment of the present disclosure, distance of the one or more UV LED units 104 from the ribbon die 102 may vary. In an embodiment of the present disclosure, the LED segment of UV LED unit 104 has a width ranges in between 50 mm to 120 mm. In another embodiment of the present disclosure, the width range of the LED segment of UV LED unit 104 may vary. In addition, power output emitted by the one or more UV LED units 104 decreases exponentially as distance of the optical fibre ribbon from the one or more UV LED units 104 increases. In an embodiment of the present disclosure, light emitted from each lamp of the one or more UV LED units 104 is incident on the optical fibre ribbon at an angle in range of about 35 degrees to 80 degrees. In another embodiment of the present disclosure, angle of incidence of light emitted from each lamp of the one or more UV LED units 104 may vary.

The one or more UV LED units 104 emit electromagnetic radiations to perform pre-curing of the matrix material of the optical fibre ribbon. In addition, pre-curing of the matrix material of the optical fibre ribbon is performed to maintain a fibre spacing between each of the plurality of optical fibres. Further, the matrix material present in between each of the plurality of optical fibres is cured. Furthermore, the matrix material present between each of the plurality of optical fibres is placed at top surface and bottom surface of the ribbon die 102. The one or more UV LED units 104 emit electromagnetic radiations of wavelength in range of about 365 nanometer to 450 nanometer. In an embodiment of the present disclosure, wavelength of electromagnetic radiations emitted from the one or more UV LED units 104 may vary.

The one or more UV LED units 104 produces a power output. In general, power is rate of doing work or transferring heat. In addition, power is amount of energy transferred or converted per unit time. The one or more UV LED units 104 produce the power output in range of about 1200 watts to 10000 watts based on wavelength on which the one or more UV LED units 104 operate upon. In an embodiment of the present disclosure, the power output of the one or more UV LED units 104 may vary. Further, the power output corresponds to illumination intensity. In general, illumination intensity or luminous intensity is a measure of wavelength-weighted power emitted by a light source in a particular direction per unit solid angle.

Figure 2:
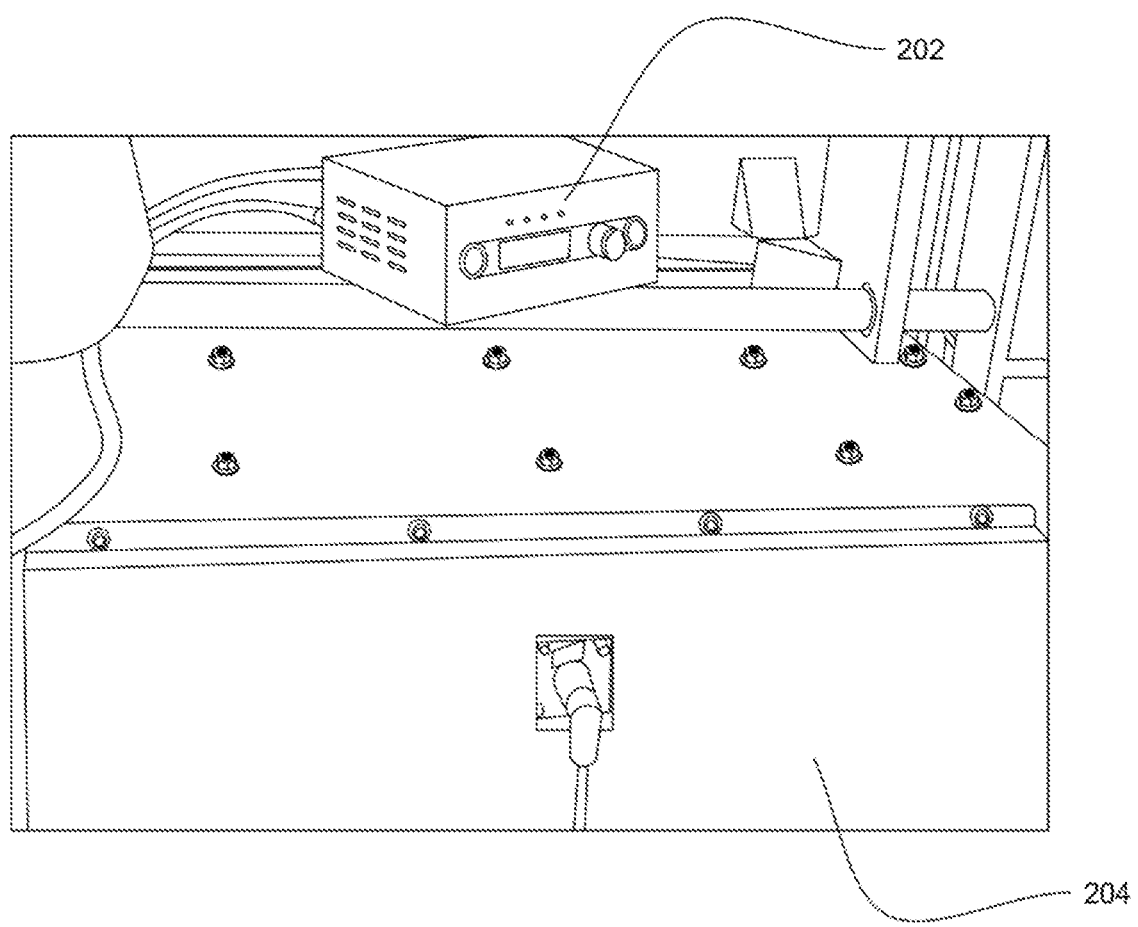
FIG. 2 illustrates a cross sectional view for performing second stage of curing during manufacturing of the optical fibre ribbon, in accordance with various embodiments of the present disclosure.

Referring to FIG. 2, this is a cross sectional view for the second stage of the method for performing curing during manufacturing of an optical fibre ribbon 200, in accordance with various embodiments of the present disclosure. The cross sectional view for the second stage of the method for performing curing during manufacturing of an optical fibre ribbon 200 includes a source 202 of the one or more UV lamps in a UV chamber 204.

The UV chamber 204 is required for the second stage of the method for performing curing during manufacturing of an optical fibre ribbon 200. The second stage of the method for performing curing during manufacturing of an optical fibre ribbon 200 is post-curing of the matrix material of the optical fibre ribbon. In addition, the UV chamber 204 cures 20 percentage of curing.

The UV chamber 204 performs the second stage of the method for performing curing during manufacturing of an optical fibre ribbon 200. The second stage of the method for performing curing during manufacturing of an optical fibre ribbon 200 is post-curing of the matrix material of the optical fibre ribbon. The source 204 of the one or more UV LED units 104 emits electromagnetic radiations towards the optical fibre ribbon to perform the second stage of the method for performing curing during manufacturing of an optical fibre ribbon 200 of the matrix material of the optical fibre ribbon.

The power output from the second stage of curing is in range of about 1000 watts to 1300 watts. In an embodiment of the present disclosure, the power output from the second stage of curing may vary.

The UV lamp of UV chamber 204 has a width ranges in between 30 cm to 100 cm. In an embodiment of the present disclosure, the width of the UV lamp of UV chamber 204 may vary. Further, the UV chamber (204) includes UV lamp, quartz tube, reflector plates, filtering system, etc.

The first stage of the method for performing curing during manufacturing of an optical fibre ribbon 100 and the second stage of the method for performing curing during manufacturing of an optical fibre ribbon 200 facilitates bending of the optical fibre ribbon in non-preferential axis without any fragility. In an embodiment of the present disclosure, the one or more ultraviolet light emitting diode (UV LED) units 104 performs 80 percent of curing of the matrix material of the optical fibre ribbon in the first stage of curing. In an embodiment of the present disclosure, the ultraviolet chamber 204 performs 20 percent of curing of the matrix material of the optical fibre ribbon in the second stage of curing.

The first stage of the method for performing curing during manufacturing of an optical fibre ribbon 100 and the second stage of the method for performing curing during manufacturing of an optical fibre ribbon 200 have numerous advantages over the prior art. The first stage of the method for performing curing during manufacturing of an optical fibre ribbon 100 and the second stage of the method for performing curing during manufacturing of an optical fibre ribbon 200 increases flexibility of the optical fibre ribbon. The first stage of the method for performing curing during manufacturing of an optical fibre ribbon 100 and the second stage of the method for performing curing during manufacturing of an optical fibre ribbon 200 facilitates to improve resilience of the optical fibre ribbon. The first stage of the method for performing curing during manufacturing of an optical fibre ribbon 100 and the second stage of the method for performing curing during manufacturing of an optical fibre ribbon 200 maintains width of the optical fibre ribbon without any variations.

Although, the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method for curing during manufacturing of an optical fibre ribbon, the method comprising:
   a first stage of curing on a matrix material of the optical fibre ribbon, wherein the first stage of curing uses one or more ultraviolet light emitting diode (UV LED) units, wherein the one or more UV LED units provide UV rays as a uni-directional beam which narrows down light intensity in one direction and illuminates maximum intensity, wherein the first stage of curing performs partial curing; and
   a second stage of curing on the matrix material of the optical fibre ribbon, wherein the second stage of curing uses one or more ultraviolet chambers (UV chambers), wherein the second stage of curing performs complete curing.

2. The method as claimed in claim 1, wherein the one or more UV chambers include a UV lamp, a quartz tube, reflector plates, or a filtering system.

3. The method as claimed in claim 1, wherein an LED segment of each of the one or more UV LED units has a width in a range between 50 mm to 120 mm.

4. The method as claimed in claim 1, wherein a UV lamp of each of the one or more UV chambers has a width in a range between 30 cm to 100 cm.

5. The method as claimed in claim 1, wherein the one or more (UV LED) units emit electromagnetic radiation towards the optical fibre ribbon to perform the first stage of curing of the matrix material of the optical fibre ribbon.

6. The method as claimed in claim 1, wherein ultraviolet lamps (UV lamps) of the one or more UV chambers emit electromagnetic radiation towards the optical fibre ribbon to perform the second stage of curing of the matrix material of the optical fibre ribbon.

7. The method as claimed in claim 1, wherein power output in the second stage of curing is in a range of 1000 watts to 1300 watts.

8. The method as claimed in claim 1, wherein the one or more UV LED units emit electromagnetic radiation of a wavelength in a range of about 365 nanometer to 450 nanometer in the first stage of curing.

9. The method as claimed in claim 1, wherein the one or more UV LED units are situated at a distance in a range of 5 millimeter to 40 millimeter from a head of a ribbon die in the first stage of curing.

10. The method as claimed in claim 1, wherein the one or more UV LED units produce power output based on an operating wavelength in a range of 1200 watts to 10000 watts in the first stage of curing.

11. The method as claimed in claim 1, wherein light emitted from each LED of the one or more UV LED units is incident on the optical fibre ribbon at an angle in a range of 35 degrees to 80 degrees in the first stage of curing.

12. A method for curing during manufacturing of an optical fibre ribbon, the method comprising:
   a first stage of curing on a matrix material of the optical fibre ribbon, wherein the first stage of curing uses one or more ultraviolet light emitting diode (UV LED) units, wherein the one or more units provide UV rays as a uni-directional beam which narrows down light intensity in one direction and illuminates maximum intensity, wherein the first stage of curing performs 80 percent of curing; and
   a second stage of curing on the matrix material of the optical fibre ribbon, wherein the second stage of curing uses one or more ultraviolet chambers (UV chambers), wherein the second stage of curing performs 100% curing.

13. The method as claimed in claim 12, wherein power output in the second stage of curing is in a range of 1000 watts to 1300 watts.

* * * * *